US005284237A

United States Patent [19]

Mello et al.

[11] Patent Number: 5,284,237

[45] Date of Patent: Feb. 8, 1994

[54] SOUND INSULATION FOR ESCALATOR BALUSTRADE

[75] Inventors: Ary O. Mello, Newington; Gerald E. Johnson, Farmington; Mukunda Pramanik, Burlington, all of Conn.

[73] Assignee: Otis Elevator Company, Farmington, Conn.

[21] Appl. No.: 998,097

[22] Filed: Dec. 30, 1992

[51] Int. Cl.[5] .................. B65G 17/06

[52] U.S. Cl. .................. 198/335; 198/337

[58] Field of Search .................. 198/335, 337

[56] References Cited

U.S. PATENT DOCUMENTS

| | | | |
|---|---|---|---|
| 3,991,877 | 11/1976 | Kraft et al. | 198/335 |
| 4,690,264 | 9/1987 | Adrian et al. | 198/335 |
| 4,841,697 | 6/1989 | Hogg et al. | 198/335 X |
| 4,842,122 | 6/1989 | Van Nort | 198/335 |
| 5,029,690 | 7/1991 | Nguyen et al. | 198/335 |
| 5,156,251 | 10/1992 | Johnson | 198/335 |

FOREIGN PATENT DOCUMENTS

| | | | |
|---|---|---|---|
| 0001877 | 1/1977 | Japan | 198/335 |
| 0013787 | 2/1978 | Japan | 198/335 |
| 2110625 | 6/1983 | Japan | 198/335 |

*Primary Examiner*—James R. Bidwell

[57] ABSTRACT

A glass escalator balustrade is mounted in an extruded metal channel which is secured to the escalator truss. Closed cell foam strips are disposed in contact with the balustrade panels. The strips insulate the balustrade from noises produced by the operating components of the escalator thereby rendering the escalator quieter for passengers. A layer of the sound insulating fiberglass nylon insulation is also adhered to the underside of the inner deck panels to insulate the latter from noise produced by the step rollers and step roller tracks.

7 Claims, 1 Drawing Sheet

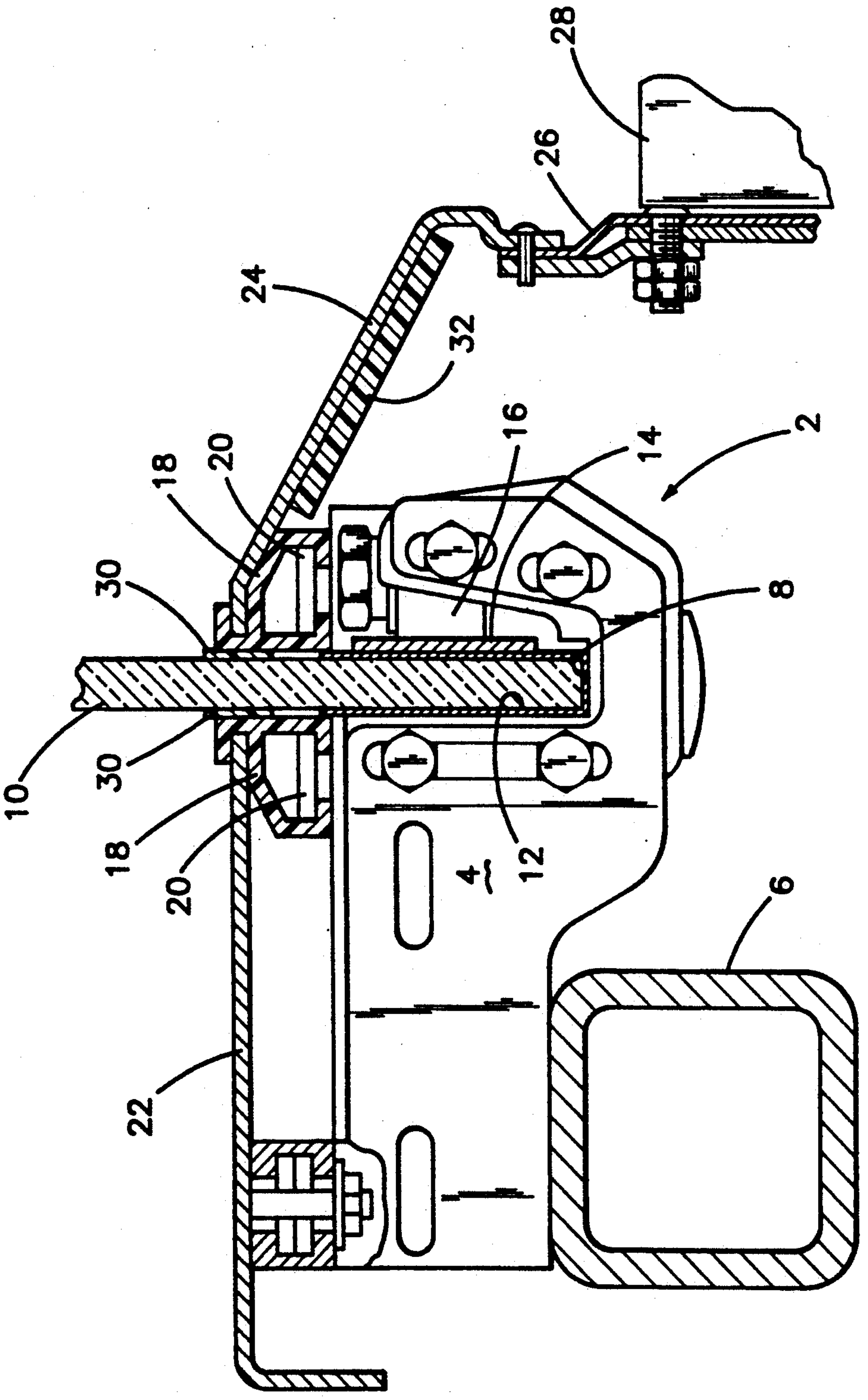
28
26
24
32
2
16
14
20
18
30
8
10
30
18
20
12
4
6
22

SOUND INSULATION FOR ESCALATOR BALUSTRADE

TECHNICAL FIELD

This invention relates to escalators and moving walkways, and more particularly, to structural components thereof which are insulated against the transmission of noise produced by moving parts of the escalator.

BACKGROUND ART

Modern escalators and moving walkways are typically provided with glass balustrade panels which streamline and provide enhanced architectural beauty to the passenger conveyors. The glass panels are typically mounted in continuous or discontinuous metal channel supports that are secured to the conveyor truss. The supports will be provided with clamps that are tightened against the base of the glass panels. A plastic or hard paper gasket will typically be sandwiched between the clamps and the glass to protect the latter from the clamps. All of the aforesaid mounting structure is covered by the inner and outer deck panels and the escalator skirts which flank the steps or tread boards. U.S. Pat. No. 4,819,781 granted Apr. 11, 1989 to Saito, et al. is representative of the aforesaid escalator balustrade mounts of the prior art.

One problem that is exacerbated by the use of glass balustrade panels relates to operational noise of the conveyor and its transmittal to passengers on the conveyor. The moving parts of the conveyor, such as the motor, handrail, and steps are all directly or indirectly connected to the truss, as is the mounting assembly for the glass balustrade panels. The moving parts of the escalator cause the truss to vibrate and create operating noise that is transmitted through the truss and through the balustrade panel mounts to the panels. When glass panels are used, their high degree of flexibility compared to other materials makes them more prone to noise transmission whereby the passengers will be more aware of the noise generated by the escalator's operation. The plastic or hard paper gaskets which are used to protect the glass panels from the clamps do little to prevent noise from being transmitted to the glass panels. Thus the streamlined and attractive modern escalators and moving walkways tend to be noisier than their less modernistic predecessors.

DISCLOSURE OF THE INVENTION

This invention relates to a glass balustrade panel mounting assembly and deck assembly which serves to suppress noise transmission from the moving parts of the conveyor to the balustrade panels thereby rendering the conveyor quieter and more comfortable for passengers to use. The balustrade panel mounting assembly may utilize a continuous channel in which the balustrade panels are seated, or a series of spaced apart channels. In either case, clamps are mounted on the support channels for clamping the balustrade panels to the channel. A plastic or hard paper gasket is mounted in the lower end of the glass panels to protect the glass from the clamps, as in the aforesaid prior art mounting assemblies. Extruded plastic retainer strips are mounted on the clamps and flank the lower edge of the glass panels above the mounting channel and clamps, and provide receptors for the edges of the inner and outer deck panels. Strips of sound attenuating or muffling closed cell foam such as PVC/Nitrile are sandwiched between the glass panels and the plastic retainer strips. These foam strips are operable to muffle sound originating beneath the deck panels and prevent such sound from resonating the glass balustrade panels. A one-inch thick fiberglass nylon insulation sheet is also bonded to the underside of the inner deck panels which flank the conveyor steps or treadboards to muffle sound trans-mission from beneath the decks toward the passengers on the steps.

It is therefore an object of this invention to provide an escalator or moving walkway having diminished apparent operating noise.

It is an additional object of this invention to provide an escalator of the character described wherein the balustrades are insulated from sound generated by the moving parts of the device.

It is another object of this invention to provide an escalator of the character described having conventional glass balustrade panel mounts which are provided with an inexpensive sound muffling capacity.

These are other objects and advantages of the invention will become more readily apparent from the following detailed description of a preferred embodiment of the invention when taken in conjunction with the accompanying drawing which is a fragmented sectional view of the balustrade panel mounting assembly of the invention.

BEST MODE FOR CARRYING OUT THE INVENTION

Referring to the drawing, there is shown a relatively conventional escalator balustrade mounting assembly which is denoted generally by the numeral 2. The mount assembly 2 includes a plurality of brackets 4 which are secured to the escalator truss 6 and which include a pocket 8 for receiving the lower edge of the glass balustrade panels 10. A hard paper or plastic gasket 12 is mounted on the glass panel 10 and is contacted by a metal plate 14 that is forced against the glass panel 10 by an adjustable wedge block 16. A pair of extruded plastic trim channels 18 are mounted on the brackets 4 by means of bolts 20 which channels 18 flank the balustrade panels 10. The channels 18 provide pockets which receive the edges of the outer deck panel 22 and the inner deck panel 24. The skirt panels 26 which flank the steps 28 are fastened to the inner deck panels 24. The plastic channels 18 are each spaced apart from the balustrade panels 10, and continuous strips 30 of the closed cell PVC/Nibrile foam are sandwiched between the channels 18 and the balustrade 10. The foam strips 30 are continuous and uninterrupted along the entirety of the lower edge of the balustrade panels and are operable to "seal" the balustrade mounting area of the escalator from the passenger-conveying area. The foam strips 30 are operable to absorb vibration and sound which emanate from the moving parts of the escalator, and block noise from reaching the glass panels 10. A relatively thick, for example, one-inch thick, fiberglass nylon composite insulation strip 32 is bonded to the underside of the inner deck panel and serves to block or muffle noise transmission through the deck panel 24. The fiberglass nylon insulation strip 32 is also continuous and uninterrupted and extends for the full length of the inner deck panel 24.

The result of incorporating the closed cell foam strip 30 and the fiberglass nylon insulation strip 32 into the escalator structure is a quieter and more pleasing ride for passengers. When the foam and fiberglass nylon strips are used, a lowering of the audible noise to passengers of 3-6 db, as compared to the prior art, is achieved.

It will be readily appreciated that the escalator or moving walkway of this invention is rendered more quiet and provides greater ride quality in a very simple and easily utilized manner. The foam and fiberglass nylon strips are placed where they will not be subjected to wear or excessive compressive loads so that they can retain their advantageous maximum sound absorption qualities.

Since many changes and variations of the disclosed embodiment of the invention may be made without departing from the inventive concept, it is not intended to limit the invention otherwise than as required by the appended claims.

What is claimed is:

1. In an escalator or moving walkway, an assembly for mounting a planar balustrade on a truss, said assembly comprising:

a) clamp means secured to said truss and defining a channel which receives a lower edge portion of said balustrade;

b) inner and outer deck panels flanking said balustrade and extending respectively toward and away from a tread portion of the escalator or moving walkway, thereby forming an inner and an outer deck;

c) inner and outer trim channels interposed between said inner and outer deck panels and said balustrade, said trim channels providing pockets for receiving edges of said inner and outer deck panels which are proximal to said balustrade; and d) sound-insulating closed-cell foam strips sandwiched between said trim channels and opposite sides of said balustrade, said foam strips being operable to muffle sound emanating from moving components of the escalator or walkway to provide a quieter environment for passengers on said tread portion.

2. The assembly of claim 1 wherein said strips are formed from a closed cell PVC/Nitrile foam.

3. The assembly of claim 1 further comprising a sound-insulating material layer secured to an underneath side of said inner deck panels to muffle transmission of sound through said inner deck panels to said tread portion.

4. The assembly of claim 3 wherein said sound-insulating material layer is formed from a fiberglass nylon composite.

5. In an escalator or moving walkway, an assembly for mounting a planar balustrade on a truss, said assembly comprising:

a) clamp means secured to said truss and defining a channel which receives a lower edge portion of said balustrade;

b) inner and outer deck panels flanking said balustrade and extending respectively toward and away from a tread portion of the escalator or moving walkway, thereby forming an inner and an outer deck; and c) a sound insulating material layer secured to an underneath side of said inner deck panels to muffle transmission of sound through said inner deck panels to said tread portion.

6. The assembly of claim 3 wherein said sound-insulating material layer is formed from a fiberglass nylon composite.

7. The assembly of claim 5 further comprising inner and outer trim channels interposed between said inner and outer deck panels and said balustrade, said trim channels providing pockets for receiving edges of said inner and outer deck panels which are proximal to said balustrade; and sound-insulating closed-cell foam strips sandwiched between said trim channels and opposite sides of said balustrade, said foam strips being operable to muffle sound emanating from moving components of the escalator or walkway to provide a quieter environment for passengers on said tread portion.

* * * * *